(12) United States Patent
Kwong et al.

(10) Patent No.: US 6,738,242 B1
(45) Date of Patent: May 18, 2004

(54) ESD-ISOLATION CIRCUIT DRIVING GATE OF BUS-SWITCH TRANSISTOR DURING ESD PULSE BETWEEN TWO I/O PINS

(75) Inventors: David Kwong, Fremont, CA (US); Paul C. F. Tong, San Jose, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 264 days.

(21) Appl. No.: 09/683,968

(22) Filed: Mar. 7, 2002

(51) Int. Cl.[7] .................................................. H02H 9/00
(52) U.S. Cl. ....................................... 361/56; 361/91.1
(58) Field of Search ................................. 361/56, 91.1

(56) References Cited

U.S. PATENT DOCUMENTS

| | | | |
|---|---|---|---|
| 4,870,530 A | 9/1989 | Hurst et al. | 361/91 |
| 5,287,241 A | 2/1994 | Puar | 361/56 |
| 5,579,200 A | 11/1996 | Rajkanan et al. | 361/111 |
| 5,602,409 A | 2/1997 | Olney | 257/362 |
| 5,682,047 A | 10/1997 | Consiglio et al. | 257/335 |
| 5,686,751 A | 11/1997 | Wu | 257/356 |
| 5,780,905 A | 7/1998 | Chen et al. | 257/355 |
| 6,037,636 A | 3/2000 | Crippen | 257/355 |
| 6,118,640 A * | 9/2000 | Kwong | 361/56 |
| 6,215,350 B1 | 4/2001 | Wyland | 327/434 |
| 6,310,379 B1 | 10/2001 | Andresen et al. | 257/355 |
| 6,320,408 B1 | 11/2001 | Kwong | 326/31 |

* cited by examiner

Primary Examiner—Stephen W. Jackson
Assistant Examiner—James A Demakis
(74) Attorney, Agent, or Firm—Stuart T. Auvinen

(57) ABSTRACT

A bus-switch transistor connects two I/O pins when an enable signal on its gate is activated. Each pin has an electro-static-discharge (ESD) protection devices. When the internal ground and the enable are floating, and an ESD pulse is applied between the two pins, an isolation circuit couples part of the ESD pulse to the gate of the bus-switch transistor, keeping the transistor turned off. This forces the ESD pulse to travel through the ESD protection devices, preventing damage to the bus-switch transistor. The isolation circuit has a capacitor between a pin and the gate of a coupling transistor. The capacitor couples the ESD pulse to the gate of the coupling transistor. The coupling transistor turns on, connecting the pin to the gate of a grounding transistor. The grounding transistor then turns on, connecting the gate of the bus-switch transistor to the other pin, which is grounded during the ESD test.

20 Claims, 6 Drawing Sheets

ESD-ISOLATION CIRCUIT DRIVING GATE OF BUS-SWITCH TRANSISTOR DURING ESD PULSE BETWEEN TWO I/O PINS

BACKGROUND OF INVENTION

This invention relates to integrated circuits (IC's), and more particularly to electro-static-discharge (ESD) protection circuits.

Rapid improvements in semiconductor processes have produced smaller and smaller transistors and other integrated devices. Unfortunately, the miniaturization of these devices also increases their risk of damage by static electricity. Relatively small electric shocks that might not be noticed by a human can melt or otherwise destroy tiny structures in an integrated transistor.

The input and output pads of an integrated circuit (IC) chip are typically outfitted with protection devices specifically designed to shunt electro-static-discharges (ESD). These ESD-protection devices are effective when the ESD pulse is applied to an input or output (I/O) pin when the ground pin is connected to a ground. During testing for ESD-protection, an ESD test machine applies a positive or negative test to the device-under-test (DUT) with its pins configured in various combinations (see JESD22-A114-B for details). This can include a zap to an I/O pin while the ground pin is connected to the ESD machine as a ground.

Since an actual electric shock can occur between any two pins on a chip, full ESD testing usually includes applying an ESD pulse between every possible combination of two pins. Other pins of the chip can be left floating.

Since the ESD-protection devices are often designed to shunt ESD current from a pin to a power or ground bus, when the ground is floating the ESD-protection device may not work optimally. For example, when an ESD pulse is applied between two different I/O pins, and the power and ground pins are left floating, the ESD current must somehow travel from the one I/O pin to the other I/O pin. Often an indirect path carries the ESD pulse, such as an internal ground bus.

Such I/O-pin to I/O-pin ESD testing can be the most difficult test to pass, especially for Bus-Switch-type products. While "normal" I/O-pin to ground or I/O-pin to power tests may pass, ESD pulses between two I/O pins with the ground pin floating may cause damage. This damage can sometimes result in leakage on a pin after the ESD test.

FIG. 1 is a diagram of a prior-art chip with grounded ESD-protection devices on each I/O pin. Pin A and pin B are I/O pins on an IC chip. Pins A and B are connected by bus-switch transistor 10 which forms a connecting channel when its gate is driven high by inverter 18. When enable EN is high, inverters 16, 18 drive the gate of bus-switch transistor 10 high, connecting pins A, B. When EN is low, transistor 10 isolates pin A from pin B.

ESD protection device 12 is connected to pin A. A wide variety of ESD protection devices could be used. ESD protection device 12 includes structures to shunt an ESD pulse from pin A to an internal ground bus. The shunt could be provided by a large diode to ground, or by a large grounded-gate n-channel transistor (either thin gate oxide or field oxide gate could be used), or by some other structure.

When an ESD pulse is applied to pin A, and the ground pin is grounded, ESD protection device 12 shunts the ESD pulse to the internal ground, and then to the ground pin and back to the ESD tester (or other common ground). ESD protection device 12 protects bus-switch transistor 10 from damage by the ESD pulse.

Pin B is likewise protected by ESD protection device 14. During normal operation in a real system, when EN is low and bus-switch transistor 10 isolated pins A, B, ESD protection device 12 can shunt any shock applied to pin A to the internal ground. This prevents the shock from being coupled to pin B, which may be coupled to another active bus. Such shocks can occur during hot-swapping of PC or network cards.

ESD-Protection Can Fail When Internal Ground Floats—FIG. 2

While ESD protection devices 12, 14 provide good protection when the internal ground is connected to an external ground, protection can be poor when the internal ground is floating. FIG. 2 highlights failure of ESD-protection devices when the internal ground is floating. In this I/O-pin to I/O-pin ESD test the power and ground pins are left floating. The ESD machine is connected between pin A and pin B. The ESD pulse is applied to pin A while pin B is grounded. All other pins, including power and ground, are left floating.

The ESD pulse applied to pin A charges up any capacitances on pin A until a high enough voltage is reached so the ESD protection device 12 turns on. Then the ESD pulse charges internal ground bus 20. Internal ground bus 20 connects to other ESD protection devices including ESD protection device 14 for the grounded pin B. The ESD pulse then travels forward through ESD protection device 14 to reach pin B.

Internal ground bus 20 has some resistance, as does ESD protection device 14 and especially ESD protection device 12, which has to snapback before conduction occurs. The total potential drop in this discharge path can be equal to the sum of the Snapback voltage of protection device 12 plus the IR drop across internal ground Bus 20 plus the forward voltage of protection device 14.

The rise in voltage on pin A is coupled to the gate of bus-switch transistor 10 by overlap capacitance 22. Overlap capacitance 22 includes the gate-to-drain overlap capacitance of bus-switch transistor 10, and may include other parasitic capacitances. Since other pins are floating during the ESD test, EN is floating, and inverter 18 does not drive the gate.

The rise in voltage of pin A is thus coupled to the gate of bus-switch transistor 10 by overlap capacitance 22. Once the gate voltage rises to more than a threshold above the source voltage of pin B, bus-switch transistor 10 turns on. The ESD pulse then has a more direct path from pin A to pin B.

Since bus-switch transistor 10 is often a large transistor to decrease the on resistance between pins A, B, the channel resistance of bus-switch transistor 10 may be less than the resistance of the path through internal ground bus 20 and ESD protection devices 12, 14. Then most of the ESD current is carried through bus-switch transistor 10. Since bus-switch transistor 10 may not be designed for such as high current, damage may result.

To prevent such damage, bus-switch transistor 10 can have a more rugged design. For example, the source and drain contacts can be moved farther from the gate edge, and a larger channel length can be used. However, these design changes can increase the capacitance and on resistance, which is undesirable. Even with these design changes, bus-switch transistor 10 may still fail the I/O-pin to I/O-pin ESD test.

What is desired is improved ESD protection. Better ESD protection is desired for I/O-pin to I/O-pin ESD tests when ground is floating. An isolation circuit for a bus-switch transistor is desired that is activated during I/O-pin to I/O-pin ESD tests or similar conditions.

DETAILED DESCRIPTION

The present invention relates to an improvement in ESD protection. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
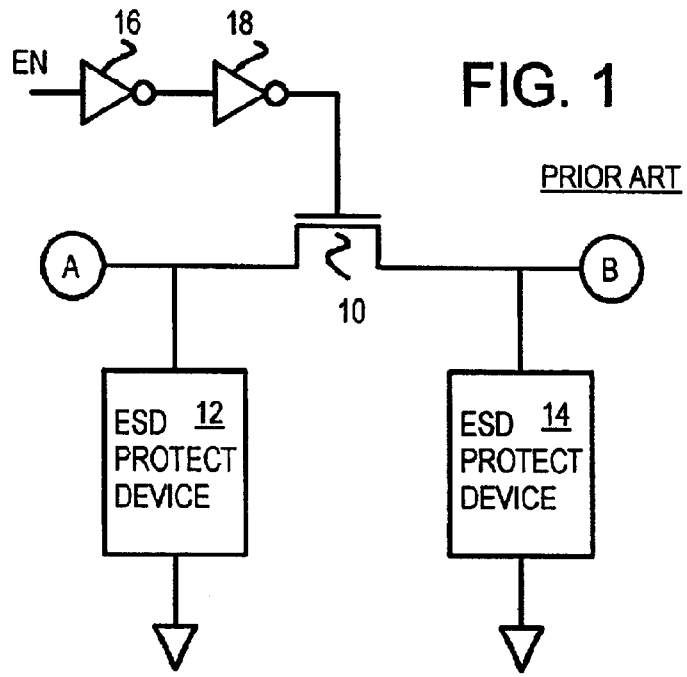
FIG. 1 is a diagram of a prior-art chip with grounded ESD-protection devices on each I/O pin.
Figure 2:
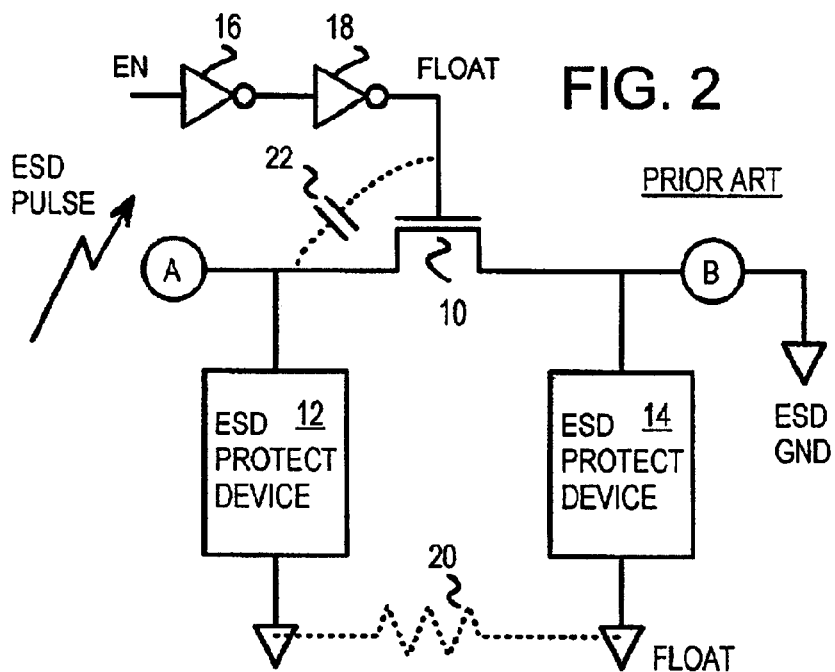
FIG. 2 highlights failure of ESD-protection devices when the internal ground is floating.
Figure 3:
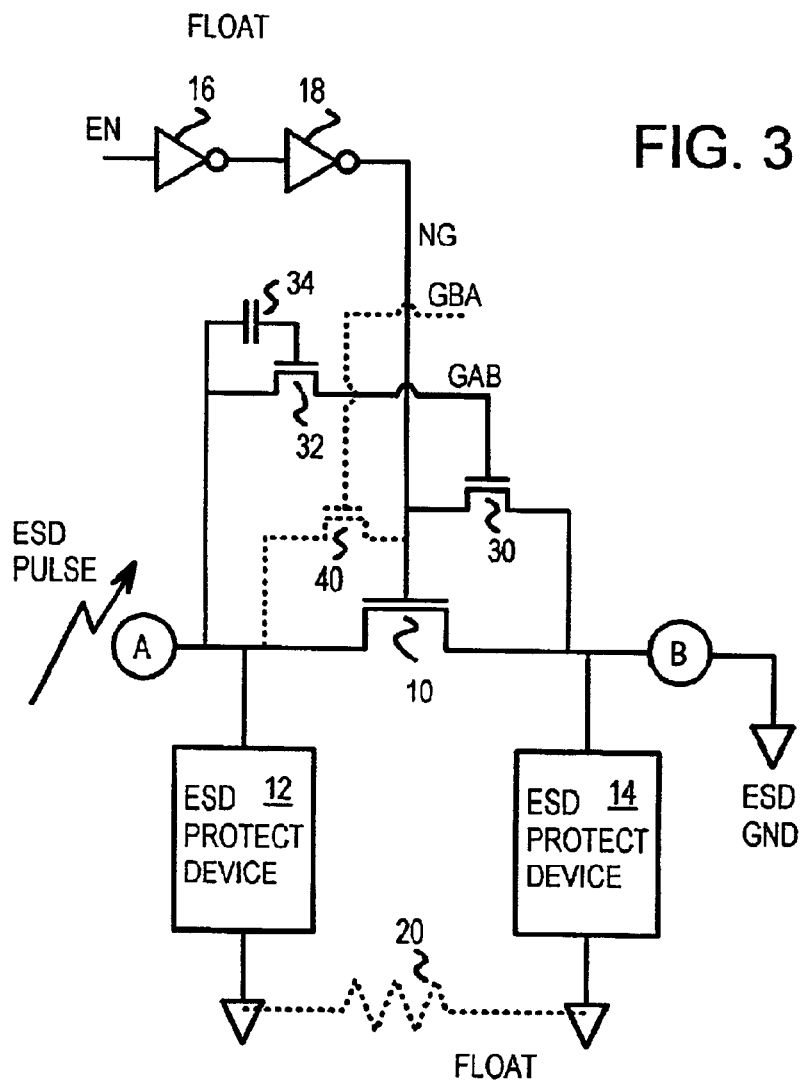
FIG. 3 is a simplified diagram of a gate-isolation circuit that improves ESD protection for I/O-pin to I/O-pin ESD tests.

FIG. 3 is a simplified diagram of a gate-isolation circuit that improves ESD protection for I/O-pin to I/O-pin ESD tests. The isolation circuit keeps bus-switch transistor 10 turned off during most of an ESD event, increasing the resistance through bus-switch transistor 10 from pin A to pin B. This forces the ESD current to go through ESD protection device 12 to internal ground bus 20 and through ESD protection device 14 to pin B. Since ESD protection devices 12, 14 are designed for the high ESD current, no failure should occur.

The isolation circuit uses the ESD pulse itself to ground the gate of bus-switch transistor 10. The enable signal EN can be floating, so that inverter 16, 18 are floating and do not drive node NG, the gate of n-channel bus-switch transistor 10.

During the ESD event, the rising voltage on pin A is coupled by capacitor 34 to the gate of n-channel coupling transistor 32, turning it on. Some of the ESD pulse is then coupled through coupling transistor 32 to A-to-B gate node GAB.

Node GAB is charged up by the ESD pulse on pin A through coupling transistor 32, causing the gate node GAB to rise more than a transistor threshold above pin B. Pin B is grounded by the ESD test machine during the I/O-pin to I/O-pin ESD test.

Pin B is the source of n-channel grounding transistor 30, which is grounded, while node GAB is the gate of grounding transistor 30. As the ESD pulse charges node GAB through connecting transistor 32, the gate-to-source voltage passes the threshold voltage, and grounding transistor 30 turns on.

The drain of grounding transistor 30 is the gate of bus-switch transistor 10, node NG. Thus the gate of bus-switch transistor 10 is coupled to grounded pin B by grounding transistor 30 when an ESD pulse is applied to pin A.

Since the gate node NG is kept grounded, bus-switch transistor 10 remains off during the ESD event. The ESD pulse is forced through ESD protection devices 12, 14 and internal ground bus 20. Bus-switch transistor 10 is protected from damage since it does not carry the ESD current, or does so for only a short period of time until grounded transistor 30 turns on.

During normal operation, when no ESD pulse occurs, transistors 30, 32 remain off. Additional transistors (not shown) can ensure that transistors 30, 32 remain off.

Capacitor 34 and transistors 30, 32 protect bus-switch transistor 10 from an ESD pulse on pin A. For a reverse ESD test, when the ESD pulse is applied to pin B rather than pin A, a second group of capacitor and transistors is needed to protect bus-switch transistor 10. N-channel grounding transistor 40 corresponds to grounding transistor 30 for this reverse direction circuit that is otherwise not shown in FIG. 3.

One design consideration is that the reverse isolation circuit should not turn on during the forward (pin A) ESD event. This can be prevented by ensuring that the voltage of node GAB is larger than the voltage of reverse (B-to-A) node GBA, which is the gate of reverse grounding transistor 40. The size of coupling transistor 32 can be made twice as large as the size of grounding transistors 30, 40 to ensure that coupling transistor 40 in the reverse isolation circuit remains off. Other ratios could also be used, depending on device and layout characteristics.

Figure 4:
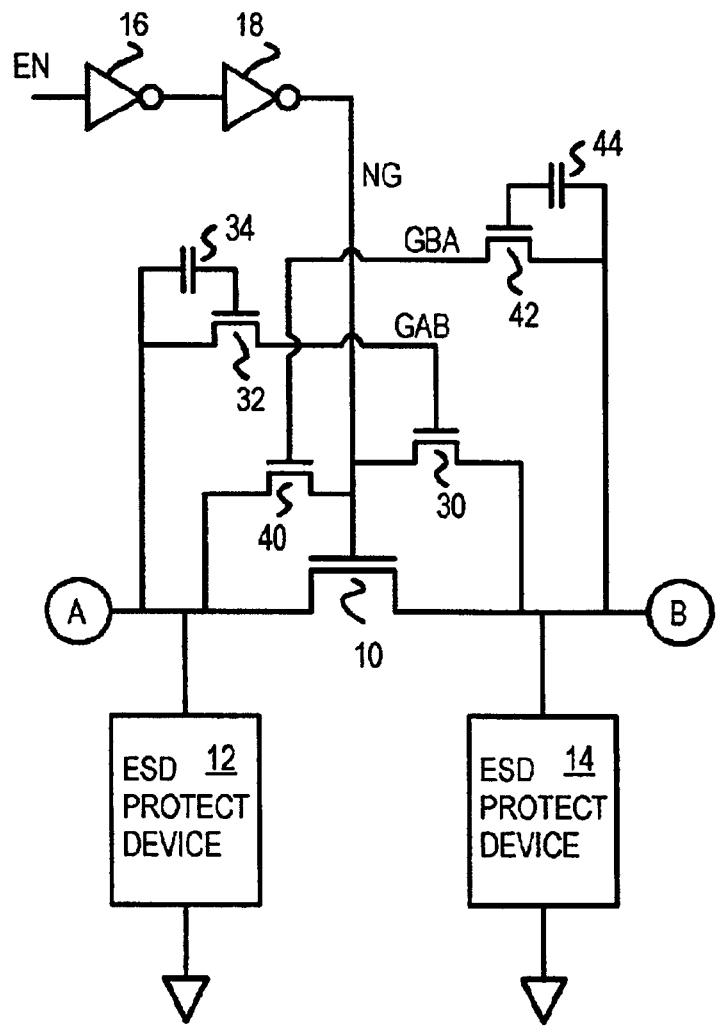
FIG. 4 is a schematic of a bi-directional isolation circuit for protecting from pin-to-pin ESD pulses on either pin.

FIG. 4 is a schematic of a bi-directional isolation circuit for protecting from pin-to-pin ESD pulses on either pin. Enable signal EN drives the gate node NG of bus-switch transistor 10 through inverters 16, 18 during normal operation. During ESD tests, EN may be floating. The ESD pulse is forced through ESD protection device 12, the internal ground bus (which may also be floating) and ESD protection device 14. ESD protection devices 12, 14 are designed to carry the high ESD current.

When a positive ESD pulse is applied to pin A, and pin B is grounded, capacitor 34 couples some of the ESD pulse from pin A to the gate of coupling transistor 32, which turns on. The ESD pulse on pin A is then used to charge node GAB through coupling transistor 32. The rising voltage of node GAB turns on grounding transistor 30, which couples gate node NG to grounded pin B. This prevents bus-switch transistor 10 from turning on during the ESD event.

When a positive ESD pulse is applied to pin B, and pin A is grounded, capacitor 44 couples some of the ESD pulse from pin B to the gate of coupling transistor 42, which turns on. The ESD pulse on pin B is then used to charge node GBA through coupling transistor 42. The rising voltage of node GBA turns on grounding transistor 40, which couples gate node NG to grounded pin A. This prevents bus-switch transistor 10 from turning on during the reverse ESD event.

Figure 5:
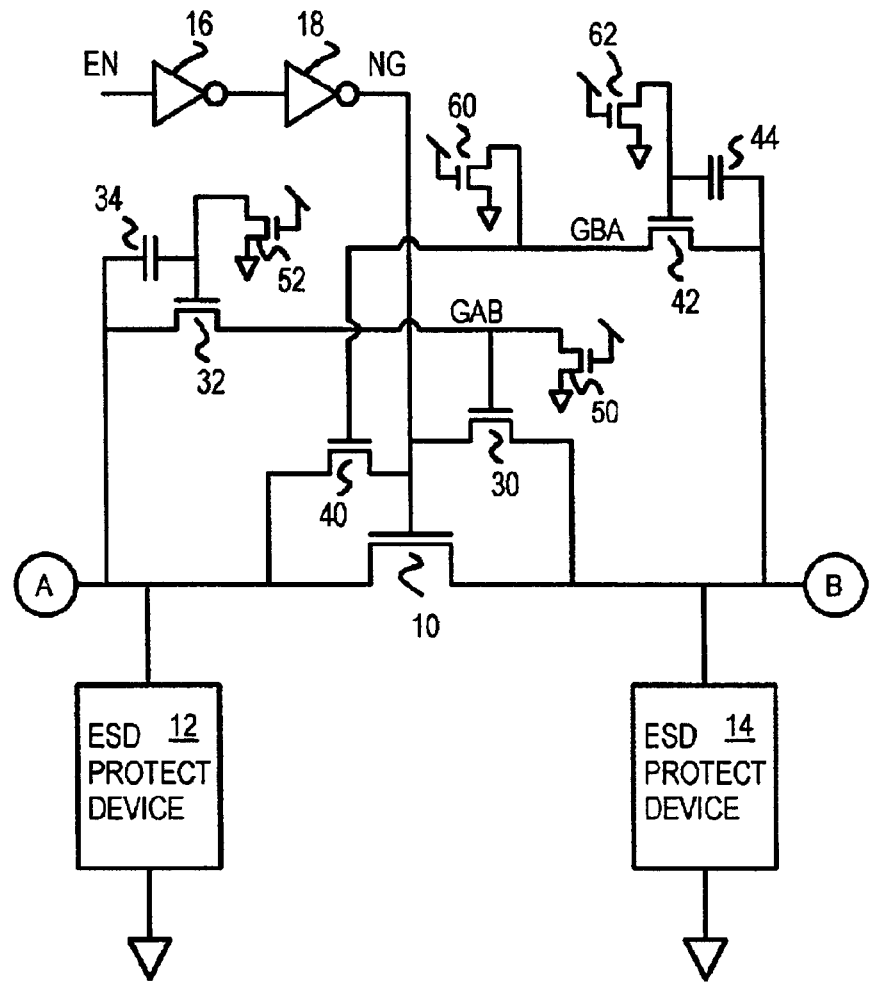
FIG. 5 shows a bi-directional ESD-isolation circuit with leaker transistors to ensure that the isolation circuit remains off during normal operation.

FIG. 5 shows a bi-directional ESD-isolation circuit with leaker transistors to ensure that the isolation circuit remains off during normal operation. Small n-channel transistors with their gates connected to power and their sources grounded can be added to discharge nodes of the isolation circuit during normal operation, or after an ESD event.

Leaker transistor 50 has its drain connected to node GAB, while leaker transistor 60 has its drain connected to node GBA. These nodes are discharged by leaker transistors 50,

60, ensuring that grounding transistors 30, 40 remain off during normal operation when power is applied to the gates of leaker transistors 50, 60.

Likewise, the drain of leaker transistor 52 is connected to the gate of coupling transistor 32, discharging the gate and capacitor 32 when power is applied to the gate of leaker transistor 52. This ensures that coupling transistor 32 remains off during normal operation. Similarly, leaker transistor 62 discharges the gate of coupling transistor 42 and capacitor 44 during normal operation. When transistor 32 has W/L=15/0.55 (microns) and transistor 30 has W/L=20/0.55, then 50 fF is an optimum value for capacitor 34; similarly, when transistor 42 has W/L=15/55 and transistor 40 has W/L=20/0.55, then 50 fF is an optimum value for capacitor 44.

Figure 6:
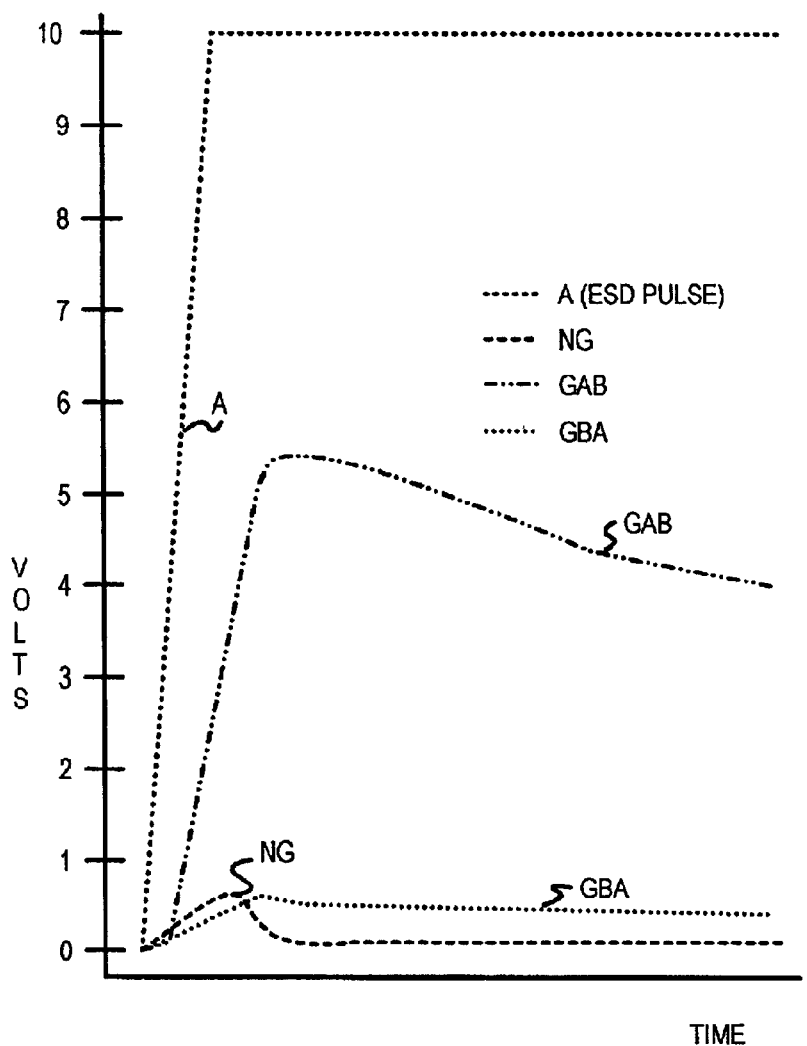
FIG. 6 is a plot of a simulation of the isolation circuit.

FIG. 6 is a plot of a simulation of the isolation circuit. A 10-volt simulated ESD pulse is applied to pin A. The gate node NG initially rises due to coupling through the gate-to-drain parasitic capacitance of the bus-switch transistor. However, the coupling transistor turns on, using the ESD pulse to charge node GAB to a little under 5.6 volt. Since this is above the transistor threshold, the grounding transistor turns on, discharging gate node NG back to ground.

The ratio of sizes of the coupling and grounding transistors ensures that less of the ESD pulse is coupled into reverse node GBA than into forward node GAB. While node GAB rises to 5.6 volt, reverse node GBA rises to only 0.5 volt. This prevents the reverse grounding transistor from turning on.

Figure 7:
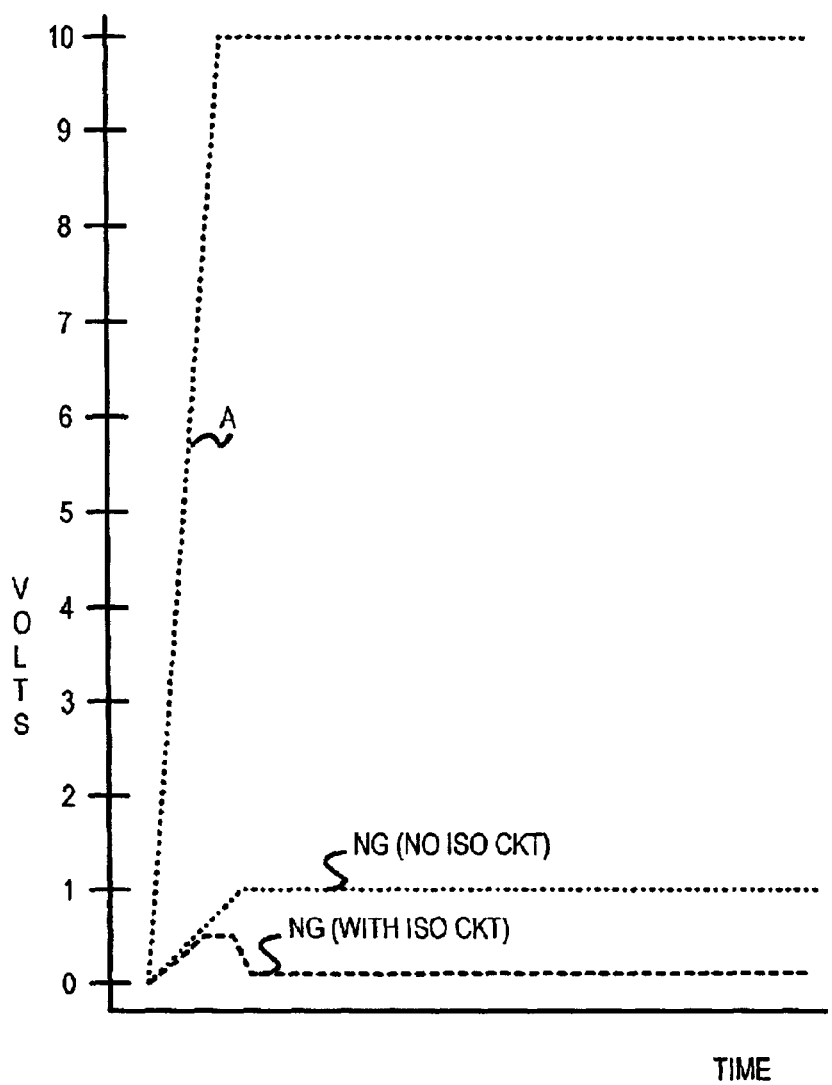
FIG. 7 is a simulated waveform showing the effectiveness of the ESD isolation circuit.

FIG. 7 is a simulated waveform showing the effectiveness of the ESD isolation circuit. When the simulated 10-volt ESD pulse is applied to pin A, the isolation circuit quickly discharges the gate node NG. This is shown by the rapid fall of NG back to ground for the line labeled NG (with iso ckt). However, when no isolation circuit is used, gate node NG remains above 1 volt for a much longer time. This keeps the bus-switch transistor turned on, allowing the ESD pulse to pass through and damage the bus-switch transistor. This is shown by the line labeled NG (no iso ckt). Optimizing the isolation circuits can ensure that node NG is never above the transistor threshold.

Alternate Embodiments

Several other embodiments are contemplated by the inventors. For example p-channel rather than n-channel transistors could be used for N-well processes. Other kinds of transistors could also be used. Sizing of transistors and capacitors can be estimated and verified or adjusted based on simulation results. Each I/O pin could be an input, output, or a bi-directional pin. For an ESD test between pins A and B, a negative ESD pulse on pin A when pin B is grounded can be considered equivalent to a positive ESD pulse applied to pin B when pin A is grounded.

Many bus-switch transistors and isolation circuits can be integrated together on a single substrate and sold as a single chip. Other functions and circuits can be included on the chip. The pin can be a bonding pad on a semiconductor chip that is for connecting to a bonding wire that electrically connects to a pin or connector of a package. The terms source and drain can change, depending on applied biases.

The leaker transistors could be replaced by other leaker devices, such as resistors. The leaker transistors could have their gates coupled to an intermediate voltage other than power. The coupling capacitors can be implemented as p-channel or n-channel transistors each with the source and drain connected together as one terminal of the capacitor, and the transistor gate as the second capacitor terminal.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A bus-switch chip protected from pin-to-pin electrostatic-discharge (ESD) pulses comprising:
    a first pin;
    a second pin;
    a bus-switch transistor having a drain coupled to the first pin and a source coupled to the second pin and a gate coupled to a bus-switch gate node, the bus-switch transistor connecting the first pin to the second pin when an activating voltage is applied to the bus-switch gate node, but isolating the first pin from the second pin when an isolating voltage is applied to the bus-switch gate node during normal operation when power is applied to the bus-switch chip;
    a first coupling capacitor, coupled between the first pin and a first coupling-gate node, for generating an activating voltage on the first coupling-gate node during an ESD pulse applied to the first pin;
    a first coupling transistor responsive to the first coupling-gate node, for connecting the first pin to a first grounding-gate node when the first coupling capacitor generates the activating voltage on the first-coupling gate node; and
    a first grounding transistor, responsive to the first grounding-gate node, for connecting the second pin to the bus-switch gate node when the first coupling transistor connects the ESD pulse on the first pin to the first grounding-gate node,
    whereby the bus-switch transistor is shut off by being connected to the second pin when the ESD pulse is applied to the first pin.

2. The bus-switch chip of claim 1 wherein the bus-switch transistor, the first coupling transistor, and the first grounding transistor are n-channel transistors.

3. The bus-switch chip of claim 2 wherein the activating voltage is a voltage at least a transistor-threshold above a source voltage.

4. The bus-switch chip of claim 1 further comprising a reverse-isolation circuit that comprises:
   a second coupling capacitor, coupled between the second pin and a second coupling-gate node, for generating an activating voltage on the second coupling-gate node during an ESD pulse applied to the second pin;
   a second coupling transistor responsive to the second coupling-gate node, for connecting the second pin to a second grounding-gate node when the second coupling capacitor generates the activating voltage on the second-coupling gate node; and
   a second grounding transistor, responsive to the second grounding-gate node, for connecting the first pin to the bus-switch gate node when the second coupling transistor connects the ESD pulse on the second pin to the second grounding-gate node,
   whereby the bus-switch transistor is shut off by being connected to the first pin when the ESD pulse is applied to the second pin.

5. The bus-switch chip of claim 4 wherein the first coupling transistor is larger than the first grounding transistor.

6. The bus-switch chip of claim 5 wherein the first coupling transistor is larger than the second grounding transistor.

7. The bus-switch chip of claim 5 wherein the first coupling transistor is at least twice as large as the first grounding transistor.

8. The bus-switch chip of claim 4 further comprising:
   a first protection device, connected between the first pin and an internal ground bus, for shunting current from the ESD pulse applied to the first pin to the internal ground bus;
   a second protection device, connected between the second pin and the internal ground bus, for shunting current from the ESD pulse applied to the second pin to the internal ground bus.

9. The bus-switch chip of claim 8 wherein the second pin is grounded and the internal ground bus is floating when the ESD pulse is applied to the first pin during a pin-to-pin ESD test;
   wherein the ESD pulse is dissipated by shunting current from the first pin through the first protection device to the internal ground bus, and from the internal ground bus to the second pin through the second protection device.

10. The bus-switch chip of claim 8 further comprising:
    a first leaker device for discharging the first grounding-gate node after the ESD pulse is applied to the first pin to turn off the first grounding transistor after the ESD pulse on the first pin has ended;
    a second leaker device for discharging the second grounding-gate node after the ESD pulse is applied to the second pin to turn off the second grounding transistor after the ESD pulse on the second pin has ended,
    whereby the first and second grounding-gate transistor are turned off after ESD pulses end.

11. The bus-switch chip of claim 10 further comprising:
    a third leaker device for discharging the first coupling-gate node after the ESD pulse is applied to the first pin to turn off the first coupling transistor after the ESD pulse on the first pin has ended;
    a fourth leaker device for discharging the second coupling-gate node after the ESD pulse is applied to the second pin to turn off the second coupling transistor after the ESD pulse on the second pin has ended.

12. The bus-switch chip of claim 11 wherein the first, second, third, and fourth leaker devices are resistors to the internal ground bus or are n-channel transistors each having a gate coupled to an internal power supply and a source coupled to the internal ground bus.

13. A shock-protected integrated circuit comprising:
    a first input that can receive an electric shock pulse;
    a second input that can be grounded when the electric shock pulse is applied to the first input;
    switch transistor means for conducting current between the first input and the second input in response to an enabling voltage applied to a control node, but for isolating the first input from the second input when an isolating voltage is applied to the control node;
    first capacitor means for capacitivly coupling an enabling voltage to a first node when the electric shock pulse is applied to the first input;
    first coupling transistor means for conducting current from the first input to a first gate node in response to the enabling voltage on the first node; and
    first disabling transistor means, responsive to the first node, for conducting current between the control node and the second input to generate the isolating voltage on the control node to disable the switch transistor means when the first coupling transistor means conducts the electric shock pulse to the first node,
    whereby the electric shock pulse causes the switch transistor means to isolate the first input from the second input.

14. The shock-protected integrated circuit of claim 13 further comprising:
    first protection means for protecting the switch transistor means from the electric shock pulse applied to the first input by shunting current to an internal supply bus;
    second protection means for protecting the switch transistor means from an electric shock pulse applied to the second input by shunting current to the internal supply bus.

15. The shock-protected integrated circuit of claim 14 wherein the internal supply bus is floating when the electric shock pulse is applied to the first input, whereby shock protection is provided when the internal supply bus is floating.

16. The shock-protected integrated circuit of claim 15 wherein the second input receives a second electric shock pulse and the first input is grounded during a reverse shock condition;
    further comprising:
        second capacitor means for capacitivly coupling an enabling voltage to a second node when the second electric shock pulse is applied to the second input;
        second coupling transistor means for conducting current from the second input to a second gate node in response to the enabling voltage on the second node; and
        second disabling transistor means, responsive to the second node, for conducting current between the control node and the first input to generate the isolating voltage on the control node to disable the switch transistor means when the second coupling transistor means conducts the second electric shock pulse to the second node, whereby the second electric shock pulse causes the switch transistor means to isolate the second input from the first input.

17. The shock-protected integrated circuit of claim 16 wherein the switch transistor means comprises an n-channel transistor.

18. An electro-static-discharge (ESD) isolation circuit comprising:

a bus-switch transistor having a drain connected to a first pad, a source connected to a second pad, and a gate connected to a bus-switch gate node;

a first capacitor coupled between the first pad and a first control-gate node;

a first coupling transistor having a gate connected to the first control-gate node, a drain connected to the first pad, and a source connected to a first isolating-gate node;

a first isolating transistor having a gate connected to the first isolating-gate node, a source connected to the second pad, and a drain connected to the bus-switch gate node;

a second capacitor coupled between the second pad and a second control-gate node;

a second coupling transistor having a gate connected to the second control-gate node, a drain connected to the second pad, and a source connected to a second isolating-gate node;

a second isolating transistor having a gate connected to the second isolating-gate node, a source connected to the first pad, and a drain connected to the bus-switch gate node.

19. The ESD isolation circuit of claim 18 further comprising:

a first ESD-protection device connected to the first pad and to an internal bus;

a second ESD-protection device connected to the second pad and to the internal bus.

20. The ESD isolation circuit of claim 19 wherein the first and second coupling transistors, the first and second isolating transistors, and the bus-switch transistor are n-channel transistors.

* * * * *